United States Patent [19]
Grant et al.

[11] Patent Number: 5,459,818
[45] Date of Patent: Oct. 17, 1995

[54] DISPLAY LIST WITH CROSSING QUEUES

[75] Inventors: Melinda S. Grant, Camas, Wash.; John J. Cassidy, III, San Diego, Calif.

[73] Assignee: Hewlett-Packard Company, Palo Alto, Calif.

[21] Appl. No.: 969,899

[22] Filed: Nov. 2, 1992

[51] Int. Cl.$^6$ ............................................... G06K 15/00
[52] U.S. Cl. ........................................... 395/114; 395/101
[58] Field of Search .................................. 395/114, 115, 395/101, 107, 117, 116, 162, 100; 358/200, 256; 369/519; 400/61

[56] References Cited

U.S. PATENT DOCUMENTS

| | | | |
|---|---|---|---|
| 4,992,956 | 2/1991 | Kaku et al. | 369/519 |
| 5,113,486 | 5/1992 | Luttmer | 395/100 |
| 5,150,454 | 9/1992 | Wood et al. | 395/114 |
| 5,150,455 | 9/1992 | Morikawa et al. | 395/114 |
| 5,226,112 | 7/1993 | Mensing et al. | 395/114 |
| 5,255,986 | 10/1993 | Koiwai | 400/61 |
| 5,276,799 | 1/1994 | Rivslin | 395/162 |
| 5,293,466 | 3/1994 | Bringmann | 395/114 |
| 5,353,388 | 10/1994 | Motoyama | 395/117 |

*Primary Examiner*—Mark R. Powell
*Assistant Examiner*—Steven P. Sax

[57] ABSTRACT

A raster type printer that utilizes a display list and crossing queues to represent the primitive objects of a page image formed of dots on an array of pixels logically organized in a sequence of adjacent swaths each swath having a first boundary that is adjacent a prior in sequence swath, if any, and a second boundary that is adjacent a next in sequence swath, if any, wherein the display list contains for each swath a swath data list that includes object records for each primitive object included in the swath, wherein an object record for a primitive object is comprised of (1) an encoded description of the primitive object if the primitive object does not cross the first boundary of the swath, or (2) a crossing queue flag if the primitive object crosses the first boundary of the swath, and wherein the records in each swath data list correspond to a predetermined sequence of primitive objects on a page image. In the course of generating the bit map for a swath, an output crossing queue is utilized for storing remainder object records for objects that cross the second boundary of the swath, while an input crossing queue is utilized to provide remainder object records for objects that cross the first boundary of a swath. In particular, records are inserted into the output crossing queue in the course of rendering a bit map for a swath, and the output crossing queue for a swath is utilized as the input crossing queue in the course of rendering the bit map for the next in sequence swath.

9 Claims, 6 Drawing Sheets

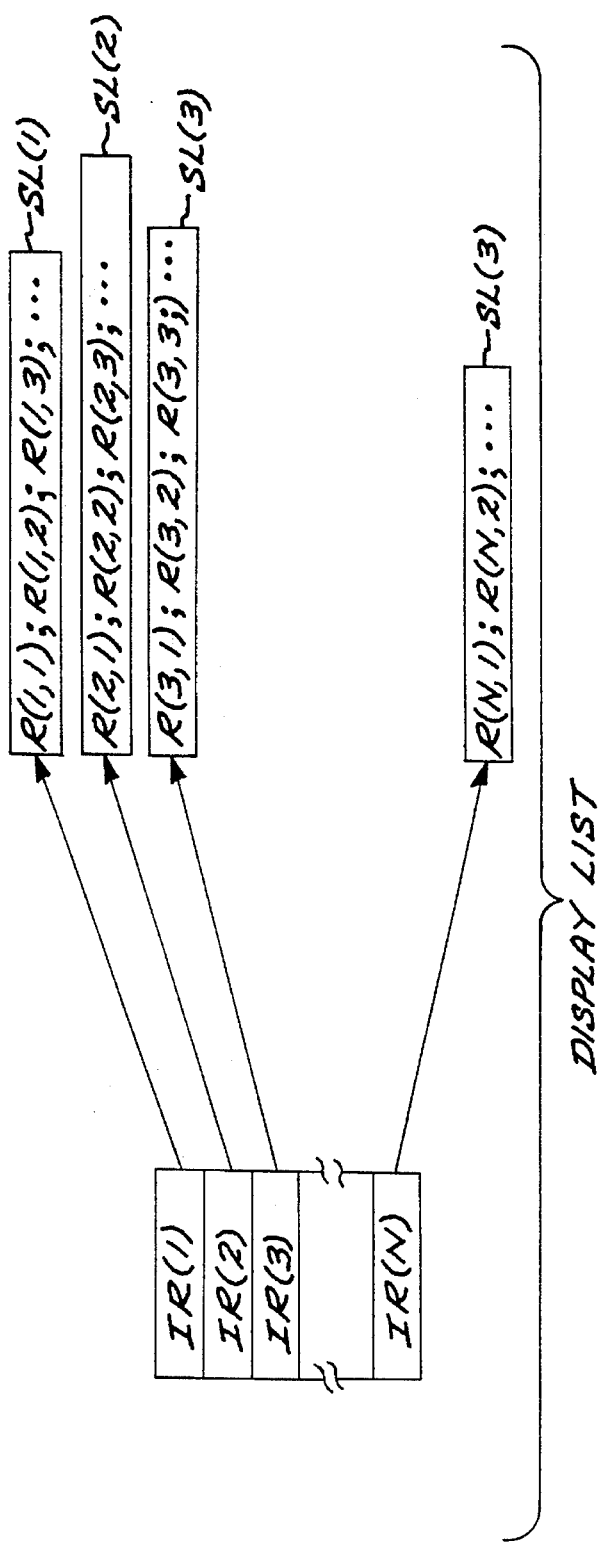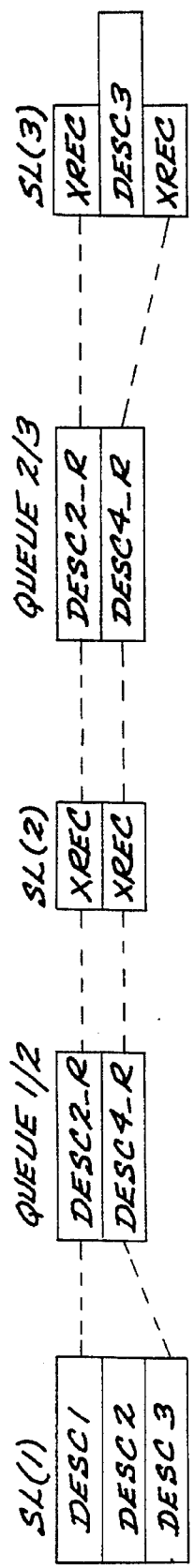
FIG. 4
FIG. 5

DISPLAY LIST WITH CROSSING QUEUES

BACKGROUND OF THE INVENTION

The subject invention is generally directed to raster type printers, and more particularly to printing techniques wherein the computational time required to prepare display lists and the memory required for storing display lists are reduced.

A raster or matrix type printer forms a printed image by printing a pattern of many individual dots on particular locations of an array or grid defined for the printing medium. The possible locations for dots are conveniently visualized as small areas such as squares or circles in an array such as a rectilinear array, for example, and are commonly called "pixels". Thus, the printing operation can be viewed as the filling of a desired pattern of pixels with ink.

Examples of raster type printers include ink jet printers, dot matrix impact printers, and laser printers.

In a raster type printer, the dots that form the printed image are printed pursuant to some form of bit map raster data array wherein the particular print data for each pixel is stored in a corresponding memory location. For the particular example of binary printing wherein a pixel is either printed or not printed with a dot, the data for each pixel comprises a binary bit at a corresponding one-bit memory location in the bit map data array.

The bit map raster data utilized by a raster type printer to print its output is generated from print data received by the printer, for example from a host computer. The print data represents the information to be printed, and can be in different forms such as raster data or input data for a computer graphics language, for example. The input print data is processed by the printer to ultimately form bit mapped raster data. For efficient raster data storage, the printed image pixel array is logically organized into a sequence or series of adjacent swaths wherein a swath extends completely along one dimension of the pixel array and extends along a fraction of the other dimension of the pixel array. For example, swaths can comprise bands each of which is of the width of the pixel array and a fraction of the height of the pixel array. By logically organizing the printed pixel array into swaths, raster data for the printed image is stored only as required, and raster data for the entire printed image does not have to be stored.

Processing of input data to produce swath raster data commonly involves the generation of a data structure called a display list which typically stores encoded descriptions of the primitive objects (also called primitives or objects) to be printed on a page, wherein objects comprise the predetermined basic or fundamental shapes such as vectors, rectangles, triangles, trapezoids, parallelograms, circles, and so forth, that are utilized by the printer to form the information to be printed. The display list is organized into a sequence of swath lists, wherein each swath list contains records that define all the objects included in a particular swath. In accordance with present techniques, each swath list contains complete descriptions of all objects included in the swath represented thereby. As a result, objects that span more than one swath are described as sub-objects in each of the swaths spanned thereby. A consideration with printing with known display list structures is the requirement for extensive display list processing and storage.

SUMMARY OF THE INVENTION

It would therefore be an advantage to provide an efficient raster printing technique having reduced display list processing and storage requirements.

The foregoing and other advantages are provided by the invention in a raster type printer that utilizes a display list and crossing queues to represent the primitive objects of a page image formed of dots on an array of pixels logically organized in a sequence of adjacent swaths each swath having a first boundary that is adjacent a prior in sequence swath, if any, and a second boundary that is adjacent a next in sequence swath, if any, wherein the display list contains for each swath a respective swath data list, each swath data list including object records for each primitive object included in the swath, wherein an object record for a primitive object is comprised of (1) an encoded description of the primitive object if the primitive object does not cross the first boundary of the swath, or (2) a crossing queue flag if the primitive object crosses the first boundary of the swath, and wherein the records in each swath data list correspond to a predetermined sequence of the primitive objects on a page image. In the course of rendering the bit map for a swath, an output crossing queue is utilized for storing remainder object records for objects that cross the second boundary of the swath, and an input crossing queue is utilized to provide remainder object records for objects that cross the first boundary of a swath. In particular, records are inserted into the output crossing queue in the course of rendering a bit map for a swath, such that the output crossing queue for a swath is utilized as the input crossing queue in the course of rendering the bit map for the next in sequence swath. In this manner, each primitive object is represented by one encoded description in the display list and appropriate crossing queue flags, which reduces storage, and moreover avoids the computational overhead required with traditional display lists wherein each object that traverses a plurality of swaths is described by an encoded description in each of the swath lists of the swaths traversed by the object.

BRIEF DESCRIPTION OF THE DRAWINGS

The advantages and features of the disclosed invention will readily be appreciated by persons skilled in the art from the following detailed description when read in conjunction with the drawing wherein:

FIG. 4 sets forth a simplified block diagram of a display list that can be utilized in the disclosed printing technique.

FIG. 5 sets forth a simplified example of the use of a display list in the disclosed printing technique.

DETAILED DESCRIPTION OF THE DISCLOSURE

Figure 1:
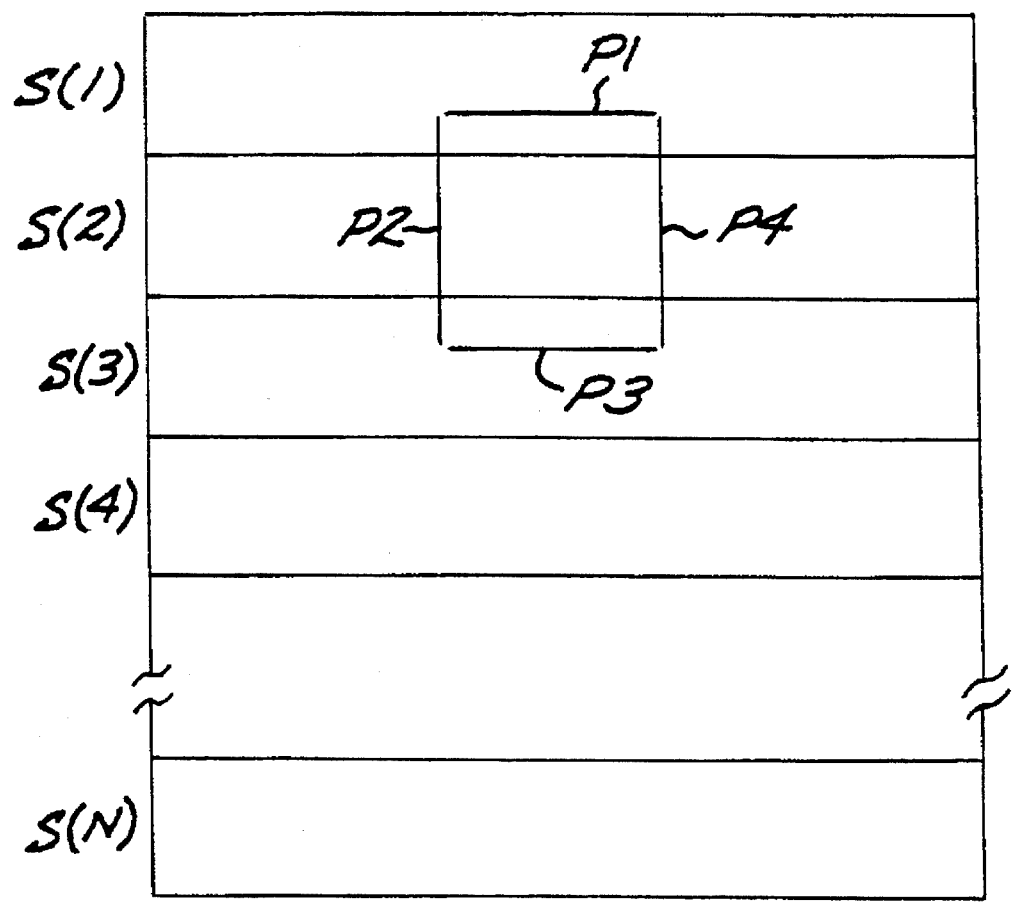
FIG. 1 sets forth a simplified schematic illustration of an illustrative example of the logical organization of swaths of a printed page image as would be printed by a raster printer in which the disclosed invention can be implemented.

In the following detailed description and in the several figures of the drawing, like elements are identified with like reference numerals.

The subject disclosure is directed generally to a technique for printing which is implemented in a raster type printer wherein a printed page image is formed by printing a pattern of individual dots on particular locations of an array or grid of pixels defined for the printing medium, and wherein the gird of pixels is logically organized into a sequence of adjacent swaths. Referring particularly to FIG. 1, set forth therein is a simplified schematic depiction of an illustrative example of a logical organization of a printed image page as a sequence of swaths S(1) through S(N). The width of each swath corresponds to the width of the printed page image, while the height of a swath is a fraction of the height of the printed page image.

The swaths of a page image are commonly printed in a sequence such as top to bottom, and for ease of understanding the subject description is based on printing swaths sequentially from top to bottom. It should be appreciated that a bottom to top sequence could also be utilized, with appropriate modifications. It should also be appreciated that the swaths of a printed page can be arranged side-by-side. Pursuant to the sequence of printing of swaths, each swath has first and second boundaries wherein the first boundary is adjacent the prior in sequence swath, if any, while the second boundary is adjacent the next in sequence swath, if any.

In accordance with conventional techniques, the contents of a printed image are formed of primitive objects or primitives which are basic building block shapes utilized to define the high order objects specified by the print data input to the printer. Examples of primitive objects include a vector, a trapezoid having a top and a bottom that are parallel to the longitudinal axes of the swaths, a circle, and a triangle with one side parallel to the longitudinal axes of the swaths. In accordance with conventional techniques, primitive objects have parameters associated therewith for defining the location, size, and other appropriate characteristics. For example, a vector would have a width, a start location, a stop location, and end shapes associated therewith. The simplified page image of FIG. 1 includes four primitive objects P1 through P4 which are four non-overlapping vectors arranged in a rectangle. These primitive objects will be discussed more particularly herein to illustrate the use of particular data structures in accordance with the invention which provide for reduced computational overhead and data storage overhead. Generally, objects that cross swath boundaries, such as the vector objects P2 and P4 shown in FIG. 1, are efficiently printed in accordance with the invention by providing for reduced computational and data storage requirements as to the construction and storage of a display list that defines the objects to be printed in each swath of a page image.

Figure 2:
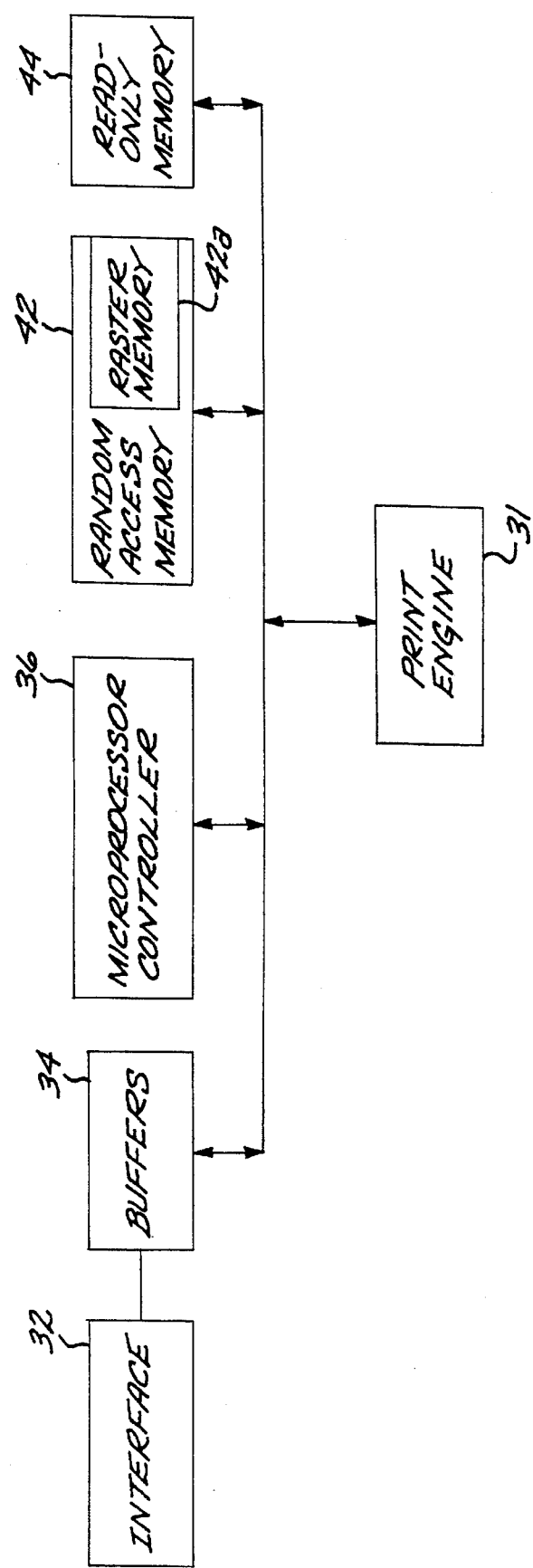
FIG. 2 sets forth a simplified schematic block diagram of a raster printer in which the disclosed invention can be implemented.

Referring now to FIG. 2, set forth therein by way of illustrative example is a simplified block diagram of a printer architecture in which the techniques of the invention can be implemented. The printer includes an interface 32 which receives print data from a host computer, for example, and stores the print data in a buffer memory 34. A microprocessor controller 36 is configured to process the print data to produce bit mapped raster data that is stored in a bit map memory 42a contained in a random access memory (RAM) 42 provided for the use of the microprocessor controller. A read-only memory 44 is also provided as appropriate for the use of the microprocessor controller 36. Processes in accordance with the invention, as described further herein, can be performed by the microprocessor controller 36 pursuant to programs contained in the read-only memory 44. A print engine 31 prints the page image pursuant to the bit map raster data generated by the microprocessor controller. In particular, the print engine 31 places dots or marks which correspond to the bit map raster data on the print medium to produce the page image. For the example of monochrome binary printing, a bit which is set in the raster bit map will cause a dot to be produced on the print medium at the pixel location corresponding to such bit, while a bit that is clear will leave the medium unmarked at the pixel location corresponding to such bit.

Figure 3:
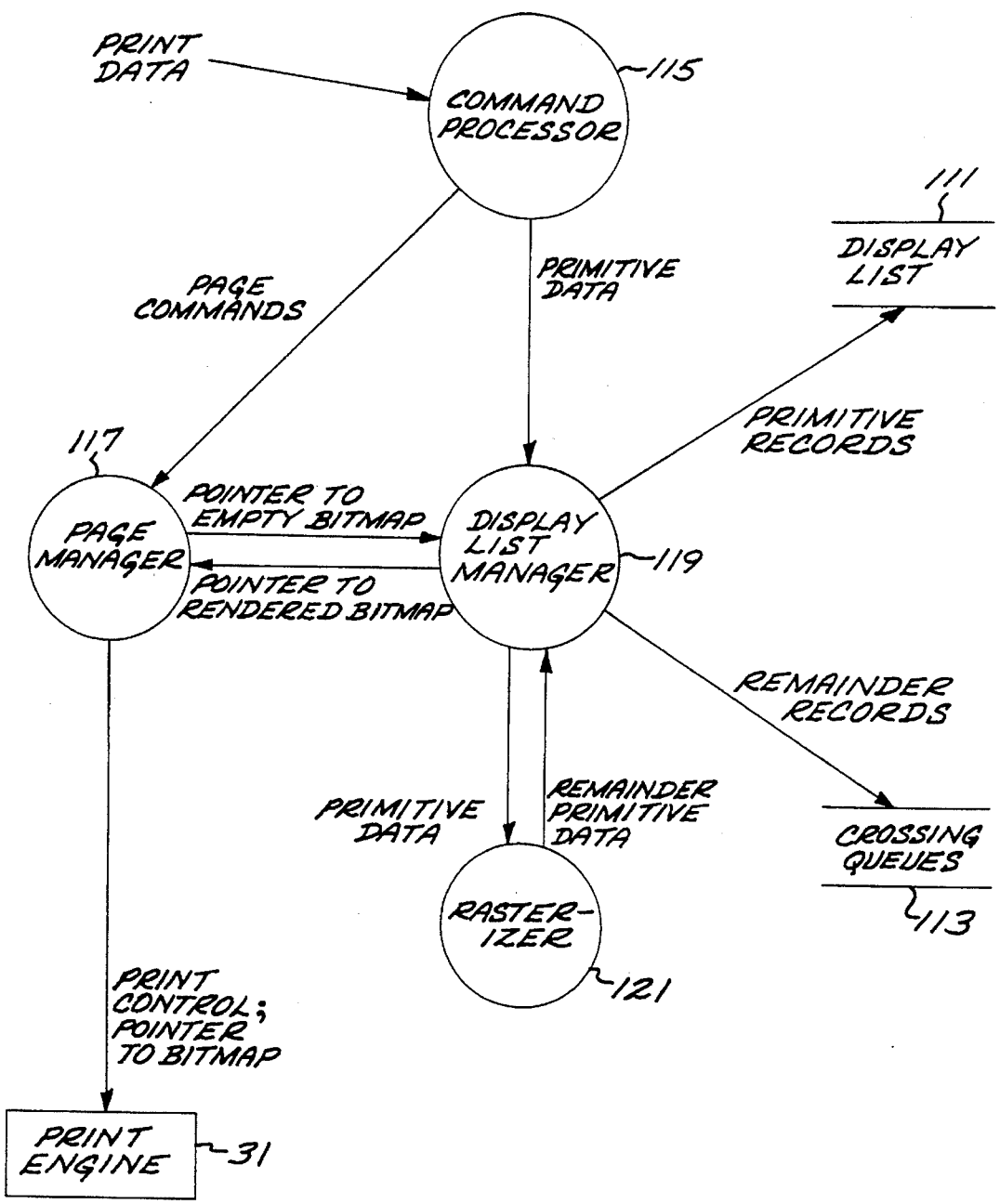
FIG. 3 sets forth a simplified schematic data flow diagram that generally illustrates the use of a display list structure and crossing queues in accordance with the invention.

Referring now to FIG. 3, set forth therein is a simplified data flow diagram that illustrates the utilization of a display list data structure 111 and crossing queues 113 for printing a page image in accordance with the invention. A command processor 115, a page manager 117, a display list manager 119, and a rasterizer 121 are processes that are implemented conventionally, for example as programs stored in the read-only memory 44 and executed by the microprocessor controller 36 of the printer of FIG. 2. The command processor 115 decomposes input print data into a sequence of primitive objects representative of the information contained in the page image to be printed, and provides to the display list manager primitive data representative of such primitive objects, for example in the form of respective procedure calls for the respective primitive objects. The primitive data is provided in temporal or layer sequence such that as to overlapping objects, a later in sequence primitive will be placed over a prior in sequence primitive object.

The page manager 117 controls the operation of the display list manager 113 and causes a bit map for each swath to be rendered into a bit map as specified by the page manager which in turn provides print control information to the print engine, including a pointer to each completed swath bit map. The print engine prints the dots of the swath as defined by the swath bit map.

The display list manager 119 more particularly processes the primitive data to produce display list primitive records that are stored in the display list 111 which includes a plurality of swath lists wherein each swath list is a first-in first-out buffer that contains respective primitive records for the primitive objects contained in the corresponding swaths of the page image. As described more fully herein, an object record comprises either (a) an encoded description of an object or (b) a crossing queue flag, whereby an object is described only once in the display list by an encoded description contained in the swath list for the topmost swath containing the object, and is described by a crossing queue flag in each of the swath lists for any vertically lower swaths containing the object. A simplified example of a procedure for generating a display list will be described further herein.

After the display list for a page image has been constructed, the display list manager retrieves the display list object records for the page, one swath list at a time in sequence starting with the swath list for the top swath, for example, and for each swath one record at a time in the same sequence in which the records were inserted into the particular swath list (i.e., in a first in first out basis). The display list manager processes each object record to provide primitive data to the rasterizer, for example in the form of a procedure call. The rasterizer renders the bit map of the portion of the primitive object contained in the particular swath being rasterized. If the primitive object crosses the lower boundary of the swath being rasterized (i.e., the rasterizer was unable to rasterize the entire object represented by the primitive data), the rasterizer returns to the display list manager remainder primitive data that represents the portion of the object that is below the swath being rasterized. By way of example, the rasterizer returns the remainder primitive data in the form of a procedure call. The display list manager processes the remainder primitive data to produce a remainder object record that comprises an encoded description of the remainder primitive, and inserts such remainder primitive record at the bottom of an output crossing queue which is one of the crossing queues 113 (i.e., the remainder record is appended to the output crossing queue). The other crossing queue is an input crossing queue whose records comprise remainder object records as produced by the display list manager pursuant to rasterization of the swath that is immediately prior in sequence to the swath currently being rasterized. In other words, the output crossing queue for a current swath being rasterized, except for the last in sequence swath, will be the input crossing queue for rasterization of the next in sequence swath; while the input crossing queue for a current swath, except for the first swath, will have been the output crossing queue for the immediately prior swath. The exceptions as to the lowermost swath and the topmost swath follow from the fact that there are no swaths below the lowermost swath and the fact that there are no swaths above the topmost swath.

When the bit map for a swath has been completed, the print manager provides the appropriate print control signals to the print engine to print the swath represented by the completed swath bit map.

Referring now to FIG. 4, schematically depicted therein is an illustrative example of a display list structure utilized by the invention to provide a high level description of the primitives or objects to be placed on a page. The display list includes an index table 111 which includes a plurality of index records IR(1) through IR(N) respectively associated with the swaths S(1) through S(N) to be printed. Each of the records IR(1) through IR(N) contains a pointer to respective swath lists SL(1) through SL(N) each of which contains a sequence of variable length object records R(I,J) that respectively represent the primitives to be printed in the swath S(I). In other words, each swath list SL(I) contains an object record R(I,J) for each primitive that is to be printed in the corresponding swath S(I). By way of illustrative example, each swath list comprises one or more linked data blocks in accordance with known data storage techniques.

In each swath list, the primitive object records are in temporal or layer sequence such that as to overlapping primitive objects, a later in sequence primitive object will be placed over a prior in sequence primitive object. As described earlier, each swath list is implemented as a first-in first-out structure, whereby the sequence of retrieval of records from the list is the same as the sequence of insertion of records into the list. A simplified example of constructing a display list in accordance with the invention will be described further herein.

In accordance with the invention, the nature of a primitive object record in a swath list depends on the following rules:

(A) if a primitive object does not cross the top boundary of the swath, the object record for that object is an encoded description designated DESC that describes the nature of the object and its location and size parameters.

(B) if a primitive object crosses downwardly across the top swath boundary from the prior in sequence swath, the record for that primitive object segment comprises a crossing queue flag XREC which has no parameters. Thus, an object that spans a plurality of swaths is described by an encoded description DESC in the swath list for the topmost swath in which the object is located, and is described by crossing queue flags XRECs in each of the sequentially succeeding swaths in which the object is located.

In the course of rendering a swath bit map pursuant to a swath list SL(I), an input crossing queue is utilized to provide an encoded description for each object that crosses downwardly into the swath and is thus represented in the swath list by a crossing queue flag XREC. As described previously, the input crossing queue for a particular swath is generated as an output crossing queue in the course of rendering the swath bit map for the immediately prior in sequence swath; i.e., the swath from which the object crosses into the current swath being rasterized. By way of illustrative example, two separate queues can be utilized wherein each is used as an output crossing queue and then as an input crossing queue alternatingly with the rasterization of the respective swaths, with a queue being emptied prior to use as an output crossing queue. Thus, an output crossing queue is produced in the course of rasterizing the swath list SL(1). The output crossing queue produced pursuant to rasterizing the swath list SL(1) is utilized as the input crossing queue for rasterizing the swath list SL(2) which produces an output crossing queue that will be utilized as the input crossing queue for rasterizing the swath list SL(3), which produces an output crossing queue, and so on to the rasterization of the swath list SL(N) which does not produce an output crossing queue.

It should be appreciated that since each primitive object that crosses the lower boundary of the swath being rasterized is represented by a crossing queue flag XREC in the next in sequence swath list, there is a one-to-one correspondence between the records in the output crossing queue and the crossing queue flags XRECs in the next in sequence swath list. Moreover, as a result of the sequence in which records are inserted in an output crossing queue and the sequence in which records are retrieved from such queue when it is an input crossing queue, the temporal or layer sequence of the primitive objects is preserved.

The foregoing relation between the records of a swath list and the input and output crossing queues can be further appreciated by reference to FIG. 5 which schematically depicts in a simplified manner for the primitives P1 through P4 shown in FIG. 1 swath lists SL(1) through SL(3), the records of the output crossing queues that would be produced by the rasterization of the swath lists SL(1) and SL(2), and the use of input crossing queues for rasterization of the swath lists SL(2) and SL(3). The swath list SL(1) contains object records DESC1, DESC2, DESC4 which comprise encoded descriptions of the objects P1, P2, P4 which are included in the topmost swath S(1). In the course of rasterizing the swath list SL(1), processing of the primitive object record DESC1 causes rasterization of the corresponding primitive object, and no generation of an encoded primitive remainder record since the object represented thereby does not cross the lower boundary of the swath S(1). Processing of the primitive object record DESC2 causes rasterization of the portion of the corresponding object included in the swath S(1), and generation of an encoded remainder primitive record DESC2_R since the corresponding object P2 crosses the lower boundary of the swath S(1). The encoded remainder primitive record DESC2_R is inserted at the bottom of the output crossing queue for the swath list SL(1) which is designated as Queue 1/2. Processing of the primitive object DESC4 also generates an encoded remainder primitive record DESC4_R which is inserted at the bottom of the Queue 1/2. Since the Queue 1/2 is empty at the start of rasterization of the swath list SL(1), at the end of rasterization of the swath list SL(1) the remainder primitive record DESC2_R is at the top of Queue 1/2 and the remainder primitive record DESC4_R is immediately below DESC2_

R.

In the course of rasterizing the swath list SL(2), the Queue 1/2 is utilized as the input crossing queue and a Queue 2/3 is utilized as the output crossing queue. Processing of the first crossing queue flag XREC causes rasterization of the portion of the object described by the first record in Queue 1/2 that is included in the swath SL(2), and the generation of an encoded remainder primitive record DESC2_R since the corresponding object P2 crosses the lower boundary of the swath S(2). The encoded remainder primitive record DESC2_R is inserted at the bottom of the output crossing queue for the swath list SL(2) which is designated as Queue 2/3. Processing of the second crossing queue flag XREC of the swath list SL(2) causes rasterization of the portion of the object described by the second record in Queue 1/2 that is included in the swath SL(2), and the generation of an encoded remainder primitive record DESC4_R since the corresponding object P4 crosses the lower boundary of the swath S(2). The encoded remainder primitive record DESC4_R is inserted at the bottom of the Queue 2/3. Since the Queue 2/3 is empty at the start of rasterization of the swath list SL(2), at the end of rasterization of the swath list SL(2) the remainder primitive record DESC2_R is at the top of Queue 2/3 and the remainder primitive record DESC4_R is immediately below DESC2_R.

In the course of rasterizing the swath list SL(3), the Queue 2/3 is utilized as the input crossing queue and an output crossing queue is not required since none of the objects in the swath S(3) cross the lower boundary thereof. Processing of the first crossing queue flag XREC causes rasterization of the portion of the object described by the first record DESC2_R in Queue 2/3 that is included in the swath SL(2), and no generation of an encoded remainder primitive since the corresponding object P2 does not cross the lower boundary of the swath S(3). Processing of the primitive object record DESC3 causes rasterization of the corresponding primitive object P3, and no generation of an encoded primitive remainder record since the object represented thereby does not cross the lower boundary of the swath S(3). Processing of the second crossing queue flag XREC of the swath list SL(3) causes rasterization of the portion of the object described by the second record in Queue 2/3 that is included in the swath SL(2), and no generation of an encoded remainder primitive record since the corresponding object P4 does not cross the lower boundary of the swath S(3).

In the foregoing, the objects P1 through P4 are non-overlapping, and thus the sequence of the records in the pertinent swath lists and the Input and output crossing queues would not affect the printed output. However, if for example the object P4 overlapped the objects P1 and P3, then the sequence of records is significant. The temporal sequence of records in the swath lists, and the temporal sequence in which records are inserted and retrieved from a Queue cooperate to maintain the temporal sequence of the printed objects.

Figure 6:
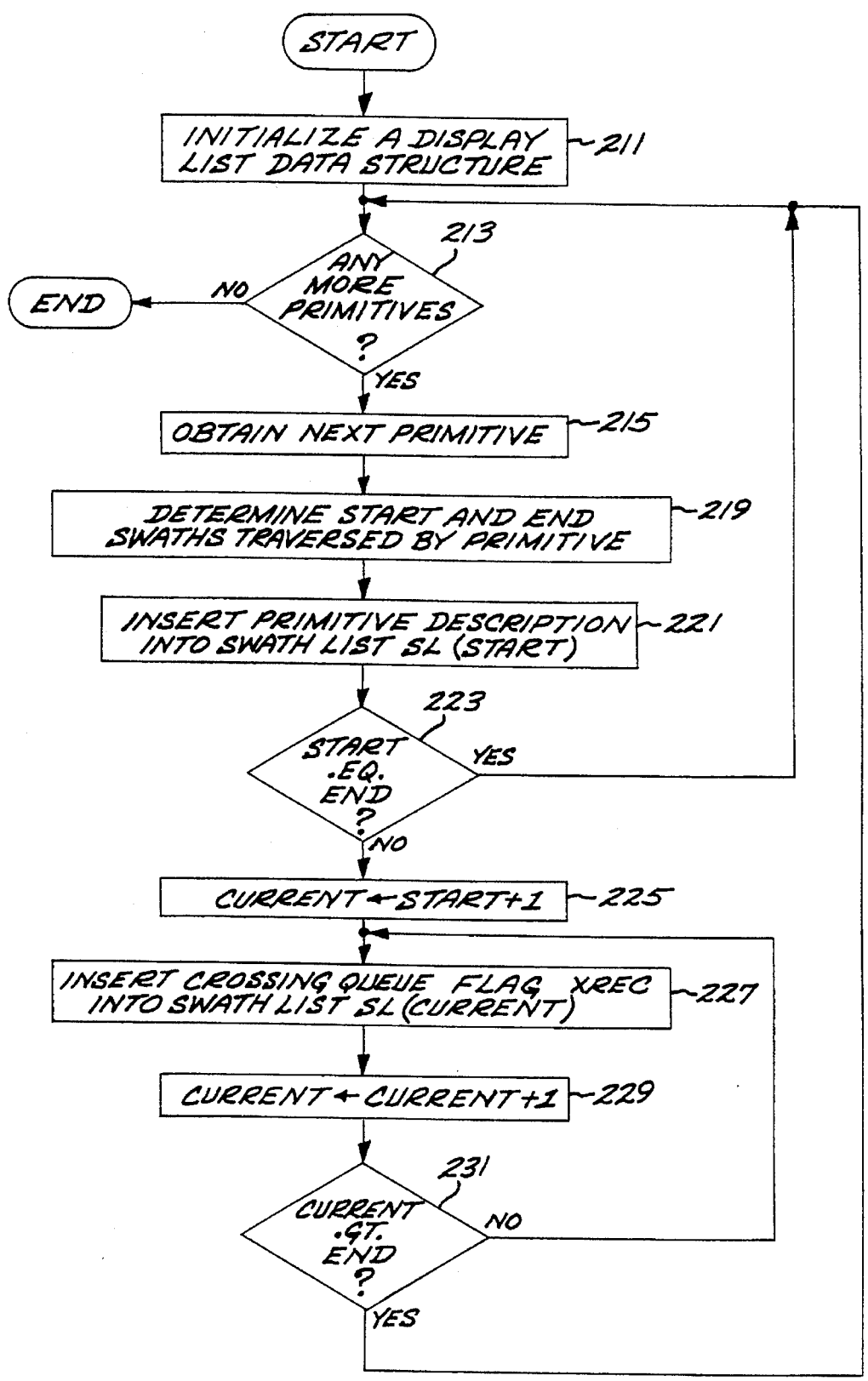
FIG. 6 sets forth by way of illustrative example a simplified flow diagram of a procedure for constructing a display list in accordance with the disclosed printing technique.

Referring now to FIG. 6, set forth therein is a flow diagram of a procedure for constructing a display list data structure for printing a page image in accordance with the invention. At 211 a display list data structure is initialized. At 213 a determination is made as to whether there are any more primitives for the page. If yes, at 215 the next primitive in sequence is obtained, and at 219 the START and END swaths of the swaths traversed by the primitive are determined, wherein the START swath is the topmost swath that includes the primitive, and the END swath is the lowermost swath that includes the primitive. At 221 an encoded description of the primitive is prepared and inserted into the START swath list SL(START) which is the swath list for the topmost swath that includes the primitive. At 223 a determination is made as to whether the START swath is equal to the END swath. If yes, indicating that the primitive is completely contained in one swath, control transfers to 213.

If the determination at 223 is no, at 225 a CURRENT swath index is set to the START swath incremented by 1. At 227 a crossing queue flag XREC is inserted into the CURRENT swath list SL(CURRENT). At 229 the CURRENT swath index is incremented by 1, and at 231 a determination is made as to whether the CURRENT swath index is greater than the END swath. If no, control transfers to 227. If yes, control transfers to 213.

Referring further to the determination at 213 as to whether all primitives on the page have been processed, if the determination is yes, the procedure ends.

Figure 7:
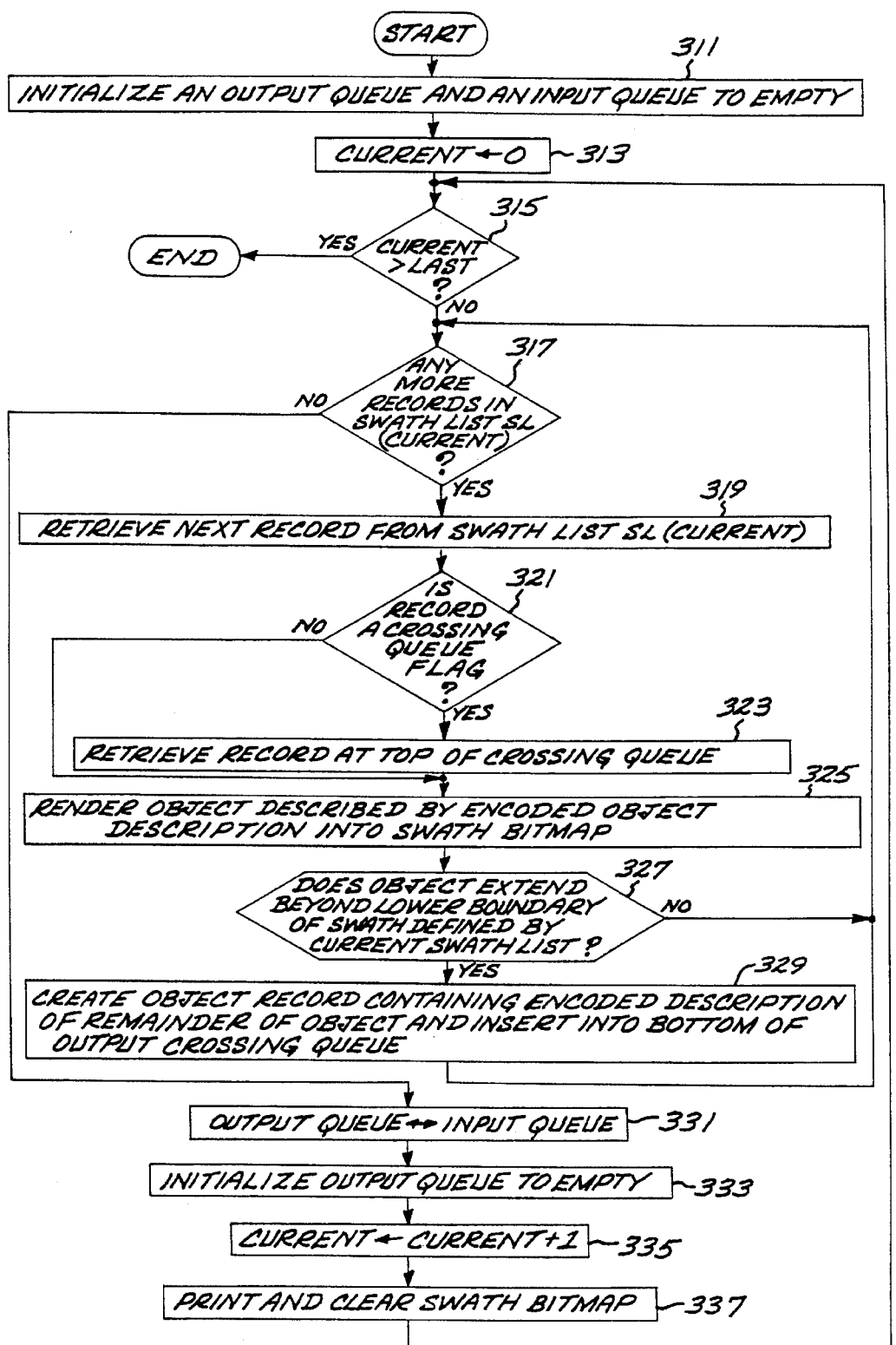
FIG. 7 sets forth by way of illustrative example a simplified flow diagram of a procedure for utilizing a display list in the disclosed printing technique.

Referring now to FIG. 7, set forth therein is a flow diagram of a procedure for printing a page image that utilizes a display list structure in accordance with the invention. At 311 an output crossing queue and an input crossing queue are initialized to be empty. At 313 a CURRENT swath index is initialized to 0, and at 315 a determination is made as to whether the CURRENT swath index is greater than the LAST swath index for the bottom swath of the page image. If no, at 317 a determination is made as to whether the CURRENT swath list SL(CURRENT) contains any more object records. If yes, at 319 the next in sequence record is retrieved from the CURRENT swath list, and at 321 a determination is made as to whether the object record is a crossing queue flag XREC. If no, at 325 the object represented by the retrieved encoded object description, which in this case has been retrieved from the CURRENT swath list, is rendered into the bit map for the current swath.

If the determination at 321 is yes, the retrieved swath list record is a crossing queue flag XREC, at 323 the record at the top of the input crossing queue is retrieved. Such record comprises an encoded description of the remainder object implicitly referenced by the crossing flag XREC, and at 325 the portion of the object represented by such encoded object description contained in the current swath is rendered into the swath bit map.

At 327 a determination is made as to whether the object represented by the encoded object description retrieved at 319 or 323 extends beyond the lower boundary of the CURRENT swath. If yes, at 329 a record comprised of an encoded description of the remainder object (i.e., the portion of the current object that is below the lower boundary of the CURRENT swath) is generated, and inserted at the bottom of the output crossing queue. Control then transfers to 317. If the determination at 327 is no, the object represented by the encoded object description retrieved at 319 or 323 does not extend beyond the lower boundary of the CURRENT swath, control transfers to 317.

Referring further to the determination at 331, if the determination there is no, there are no more records in the CURRENT swath list, at 331 the present output crossing queue is designated to be the input crossing queue for the next swath and the present input crossing queue is designated as the output crossing queue for the next swath. At 333 the output crossing queue is emptied, and at 335 the CURRENT swath index is incremented by 1. At 337, the swath bit map is printed and cleared for the next swath, and control transfers to 315.

If the determination at 315 is yes, the CURRENT swath index is greater than the LAST swath of the page image, the procedure ends.

While the foregoing has been described in the context of processes implemented by programmed operation of a microprocessor controller, it should appreciated that the processes can be implemented in specialized hardware. It should also be appreciated that the processes disclosed herein can also be implemented in any type of raster display devices which form, pursuant to input display data, a display image by illuminating a pattern of many individual dots or pixels of an array or grid defined for the display medium.

The foregoing has been a disclosure of a raster printing technique that utilizes a display list data structure and crossing queues to advantageously reduce computational and storage overhead. In particular, with traditional display list techniques, each object that spans a plurality of swaths is represented by respective encoded descriptions in each of the swaths in which it is included. This requires rasterization or decomposition of the entire object in order to arrive at the encoded descriptions for each of the portions contained in the different swaths, and also a large amount of storage for the encoded descriptions. In contrast, with the disclosed raster printing technique, each object is represented by one encoded description and appropriate crossing queue flags, which reduces storage, and moreover avoids the initial rasterization or decomposition required with traditional display lists.

Although the foregoing has been a description and illustration of specific embodiments of the invention, various modifications and changes thereto can be made by persons skilled in the art without departing from the scope and spirit of the invention as defined by the following claims.

What is claimed is:

1. In a raster type printer for printing dots on an array of pixels logically organized in a sequence of adjacent swaths each swath having a first boundary that is adjacent a prior in sequence swath, if any, and a second boundary that is adjacent a next in sequence swath, if any, a method for printing comprising the steps of:

(A) decomposing input print data into a predetermined sequence of primitive objects of predetermined shapes;

(B) constructing for each of the swaths a swath data list comprised of object records for each primitive object included in the swath, wherein an object record is comprised of (a) an encoded description of the primitive object if the object does not cross the first boundary of the swath, or (b) a crossing queue flag if the primitive object crosses the first boundary of the swath, and wherein the records in each swath data list are in the predetermined sequence of primitive objects;

(C) rendering a bit map for each of the plurality of swath data lists starting with the first in sequence by:

(1) rendering each object in the swath data list into a bit map for the corresponding swath in the predetermined sequence of primitive objects pursuant to an encoded description of the object which is contained in (i) the swath data list record for the primitive object if the primitive object does not cross the first boundary of the swath, or (ii) an input crossing queue if the object record for the primitive object is a crossing queue flag;

(2) placing a remainder object record into an output crossing queue for each primitive object that extends below the second boundary of the swath, wherein such remainder object record contains an encoded description of the primitive object for use in rasterizing the object segment contained in the next in sequence swath, and wherein the output crossing queue for one swath is utilized as the input crossing queue for a next in sequence swath if there is one; and (D) printing the rendered bit map of each swath upon completion of steps (C)(1) and (C)(2).

2. In a raster type printer for printing dots on an array of pixels logically organized in a sequence of adjacent swaths each swath having a first boundary that is adjacent a prior in sequence swath, if any, and a second boundary that is adjacent a next in sequence swath, if any, and wherein the data to be printed is represented in a display list having for each swath a swath data list that includes an object record for each object included in the swath defined by such swath data list, a method for printing each swath starting with the first in sequence swath, comprising the steps of:

(A) rendering each object in the swath into a bit map for the swath pursuant to an encoded description of the object which is contained in (i) the swath data list record for the object if the object does not cross the first boundary of the swath, or (ii) an input crossing queue if the object record for the object is a crossing queue flag;

(B) placing a remainder object record into an output crossing queue for each object that extends below the second boundary of the swath, wherein such remainder object record contains an encoded description of the object for use in rasterizing the object segment contained in a next in a sequence swath if there is one, whereby the output crossing queue is utilized as the input crossing queue for a next in sequence swath if there is one; and (C) printing the rendered bit map of each swath upon completion of steps (A) and (B).

3. A raster type printer for printing dots on an array of pixels in a pixel array logically organized in a sequence of adjacent swaths each swath having a first boundary that is adjacent a prior in sequence swath, if any, and a second boundary that is adjacent a next in sequence swath, if any, comprising:

means for decomposing input print data into a predetermined sequence of primitive objects of predetermined shapes;

means for constructing for each swath a swath data list comprised of object records for each primitive object included in the swath, wherein an object record for a primitive object is comprised of (a) an encoded description of the primitive object if the primitive object does not cross the first boundary of the swath, or (a) a crossing queue flag if the primitive object crosses the first boundary of the swath, and wherein the records in each swath data list are in the predetermined sequence of primitive objects;

raster processing means for (1) rendering the objects in each swath into a bit map for the swath in the predetermined sequence of primitive objects pursuant to an encoded description of the primitive object which is contained in (i) the swath data list record for the primitive object if the primitive object does not cross the first boundary of the swath, or (ii) an input crossing queue if the object record for the primitive object is a crossing queue flag, and (2) placing a remainder object record into an output crossing queue for each primitive object that extends below the second boundary of the swath, wherein such remainder object record contains an encoded description of the primitive object for use in rasterizing the portion of the primitive object contained in the next in sequence swath, and wherein the output crossing queue for one swath is utilized as the input crossing queue for a next in sequence swath if there is one; and means for printing the rendered bit map of each swath.

4. A raster type printer for printing dots on an array of pixels in a pixel array logically organized in a sequence of adjacent swaths each swath having a first boundary that is adjacent a prior in sequence swath, if any, and a second boundary that is adjacent a next in sequence swath, if any, comprising:

a display list having for each swath a swath data list that includes an object record for each object included in the swath defined by such swath data list;

an input crossing queue;

an output crossing queue;

raster processing means for (1) rendering the objects in each swath into a bit map for the swath in the predetermined sequence of primitive objects pursuant to an encoded description of the primitive object which is contained in (i) the swath data list record for the primitive object if the primitive object does not cross the first boundary of the swath, or (ii) said input crossing queue if the object record for the primitive object is a crossing queue flag, and (2) placing a remainder object record into said output crossing queue for each primitive object that extends below the second boundary of the swath, wherein such remainder object record contains an encoded description of the primitive object for use in rasterizing the portion of the primitive object contained in the next in sequence swath, and wherein the output crossing queue for one swath is utilized as the input crossing queue for a next in sequence swath if there is one; and means for printing the bit map of each swath after the bit map therefor has been rendered.

5. In a raster type display for displaying dots on an array of pixels logically organized in a sequence of adjacent swaths each swath having a first boundary that is adjacent a prior in sequence swath, if any, and a second boundary that is adjacent a next in sequence swath, if any, a method for displaying comprising the steps of:

(A) decomposing input display data into a predetermined sequence of primitive objects of predetermined shapes;

(B) constructing for each of the swaths a swath data list comprised of object records for each primitive object included in the swath, wherein an object record is comprised of (a) an encoded description of the primitive object if the object does not cross the first boundary of the swath, or (b) a crossing queue flag if the primitive object crosses the first boundary of the swath, and wherein the records in each swath data list are in the predetermined sequence of primitive objects;

(C) rasterizing each of the plurality of swaths starting with the first in sequence by:

(1) rendering each object in the swath into a bit map for the swath in the predetermined sequence of primitive objects pursuant to an encoded description of the object which is contained in (i) the swath data list record for the object if the primitive object does not cross the first boundary of the swath, or (ii) an input crossing queue if the object record for the primitive object is a crossing queue flag;

(2) placing a remainder object record into an output crossing queue for each primitive object that extends below the second boundary of the swath, wherein such remainder object record contains an encoded description of the primitive object for use in rasterizing the object segment contained in the next in sequence swath, and wherein the output crossing queue for one swath is utilized as the input crossing queue for a next in sequence swath if there is one; and (D) displaying the rendered bit map of each swath upon completion of steps (C)(1) and (C)(2).

6. In a raster type display for displaying dots on an array of pixels logically organized in a sequence of adjacent swaths each swath having a first boundary that is adjacent a prior in sequence swath, if any, and a second boundary that is adjacent a next in sequence swath, if any, and wherein the data to be displayed is represented in a display list having a swath data list for each swath and each swath data list includes an object record for each object included in the swath defined by such swath data list, a method for displaying each swath starting with the first in sequence swath, comprising the steps of:

(A) rendering each object in the swath into a bit map for the swath pursuant to an encoded description of the object which is contained in (1) the swath data list record for the object if the object does not cross the first boundary of the swath, or (2) an input crossing queue if the object record for the object is a crossing queue flag;

(B) placing a remainder object record into an output crossing queue for each object that extends below the second boundary of the swath, wherein such remainder object record contains an encoded description of the object for use in rasterizing the object segment contained in a next in a sequence swath if there is one, whereby the output crossing queue is utilized as the input crossing queue for a next in sequence swath if there is one; and (C) displaying the rendered bit map of each swath upon completion of steps (A) and (B).

7. A raster type display for displaying dots on an array of pixels in a pixel array logically organized in a sequence of adjacent swaths each swath having a first boundary that is adjacent a prior in sequence swath, if any, and a second boundary that is adjacent a next in sequence swath, if any, comprising:

means for decomposing input display data into a predetermined sequence of primitive objects of predetermined shapes;

means for constructing for each swath a swath data list comprised of object records for each primitive object included in the swath, wherein an object record for a primitive object is comprised of (1) an encoded description of the primitive object if the primitive object does not cross the first boundary of the swath, or (2) a crossing queue flag if the primitive object crosses the first boundary of the swath, and wherein the records in each swath data list are in the predetermined sequence of primitive objects;

raster processing means for (a) rendering the objects in each swath into a bit map for the swath in the predetermined sequence of primitive objects pursuant to an encoded description of the primitive object which is contained in (1) the swath data list record for the object if the primitive object does not cross the first boundary of the swath, or (2) an input crossing queue if the object record for the primitive object is a crossing queue flag, and (b) placing a remainder object record into an output crossing queue for each primitive object that extends below the second boundary of the swath, wherein such remainder object record contains an encoded description of the primitive object for use in rasterizing the portion of the primitive object contained in the next in sequence swath, and wherein the output crossing queue for one swath is utilized as the input crossing queue for a next in sequence swath if there is one; and means for displaying the rendered bit map.

8. A raster type display for displaying dots on an array of pixels in a pixel array logically organized in a sequence of adjacent swaths each swath having a first boundary that is adjacent a prior in sequence swath, if any, and a second boundary that is adjacent a next in sequence swath, if any, comprising:

a display list having for each swath a swath data list that includes an object record for each object included in the swath defined by such swath data list;

an input crossing queue;

an output crossing queue;

raster processing means for (a) rendering the objects in each swath into a bit map for the swath in the predetermined sequence of primitive objects pursuant to an encoded description of the primitive object which is contained in (1) the swath data list record for the object if the primitive object does not cross the first boundary of the swath, or (2) said input crossing queue if the object record for the primitive object is a crossing queue flag, and (b) placing a remainder object record into said output crossing queue for each primitive object that extends below the second boundary of the swath, wherein such remainder object record contains an encoded description of the primitive object for use in rasterizing the portion of the primitive object contained in the next in sequence swath, and wherein the output crossing queue for one swath is utilized as the input crossing queue for a next in sequence swath if there is one; and means for displaying the rendered bit map of each swath.

9. A data structure for use in a raster type output device that outputs a page image comprised of dots on an array of pixels logically organized in a sequence of adjacent swaths each swath having a first boundary that is adjacent a prior in sequence swath, if any, and a second boundary that is adjacent a next in sequence swath comprising:

a display list for a page image including respective swath data lists for each of the swaths of the page image, each swath data list including object records for each primitive object included in the swath, wherein an object record for a primitive object is comprised of (1) an encoded description of the primitive object if the primitive object does not cross the first boundary of the swath, or (2) a crossing queue flag if the primitive object crosses the first boundary of the swath, and wherein the records in each swath data list correspond to a predetermined sequence of primitive objects on a page image;

an output crossing queue for storing remainder object records for objects that cross the second boundary of a swath; and an input crossing queue containing remainder object records for objects that cross the first boundary of a swath;

wherein records are inserted into the output crossing queue in the course of generating a bit map for swath, and wherein the output crossing queue for a swath is utilized as the input crossing queue in the course of generating the bit map for the next in sequence swath.

* * * * *